United States Patent [19]

Benazzi et al.

[11] Patent Number: 6,139,719
[45] Date of Patent: Oct. 31, 2000

[54] LONG-RETICULATE-DISTANCE PILLARED DIOCTAHEDRAL PHYLLOSILICATE 2:1, CATALYST AND CONVERSION PROCESS

[75] Inventors: Eric Benazzi, Chatou; Jocelyne Brendle, Wittenheim; Ronan Le Dred, Riedisheim; Jacques Baron, Moulhouse; Daniel Saehr, Riedisheim; Nathalie Georges-Marchal, Saint Hilaire; Sylvie Lacombe, Rueil Mailmaison, all of France

[73] Assignee: Institut Francais du Petrole

[21] Appl. No.: 09/169,966

[22] Filed: Oct. 13, 1998

[30] Foreign Application Priority Data

Oct. 13, 1997 [FR] France .................. 97 12864
Oct. 13, 1997 [FR] France .................. 97 12865

[51] Int. Cl.⁷ .................................................. C10G 47/00
[52] U.S. Cl. ............... 208/111.01; 208/109; 208/111.1; 208/111.2; 502/63; 502/64; 502/68; 502/79; 502/80; 502/84
[58] Field of Search ................... 502/80, 84, 85, 502/63, 68, 64, 79; 208/109, 111.01, 111.1, 111.2

[56] References Cited

U.S. PATENT DOCUMENTS 5,059,568 10/1991 McCauley ................ 502/65
5,308,812 5/1994 Salem et al. ............. 502/63
5,389,593 2/1995 Holmgren ................ 502/63

FOREIGN PATENT DOCUMENTS 0 341 023 11/1989 European Pat. Off. .
0 508 005 10/1992 European Pat. Off. .
88/00091 1/1988 WIPO .

Primary Examiner—Tom Dunn
Attorney, Agent, or Firm—Millen, White, Zelano & Branigan, P.C.

[57] ABSTRACT

The invention relates to dioctahedral phyllosilicates 2:1 whose basal spacing is at least equal to $2.0 \times 10^{-9}$ m and which in the interlayer space comprise pillars based on at least one of the compounds that is selected from the group that is formed by $SiO_2$, $Al_2O_3$, $TiO_2$, $ZrO_2$, $V_2O_5$, or any combination of the latter. Preferably, they contain fluorine. The invention also relates to a process for their preparation that includes treatment with a surfactant, followed by treatment with a primary or secondary amine and at least one alkoxide of an element that is selected from the group that is formed by the elements Si, Al, Zr, Ti and V. The invention also relates to a catalyst that comprises said phyllosilicate, at least one matrix, and optionally a zeolite Y. The invention also relates to a process for converting hydrocarbons with this catalyst, and in particular a hydrocracking process.

26 Claims, No Drawings

LONG-RETICULATE-DISTANCE PILLARED DIOCTAHEDRAL PHYLLOSILICATE 2:1, CATALYST AND CONVERSION PROCESS

FIELD OF THE INVENTION

This invention relates to dioctahedral phyllosilicates 2:1, preferably synthesized in a fluoride medium in the presence of hydrofluoric acid and/or another source of fluoride anions, whereby said phyllosilicates are pillared and have a large basal spacing; whereby the basal spacing that is represented by $d_{001}$ is the sum of the thickness of a layer and the interlayer spacing.

The invention also relates to a preparation process for obtaining said phyllosilicate.

These phyllosilicates can fall within the composition of catalysts that are used for hydrocracking.

This invention also relates to a catalyst that comprises at least one dioctahedral phyllosilicate 2:1, preferably synthesized in a fluoride medium (in the presence of hydrofluoric acid and/or another source of fluoride anions) and then pillared, whereby said phyllosilicate has a large basal spacing (whereby the basal spacing is the sum of the thickness of a layer and the interlayer spacing), whereby the catalyst also comprises at least one matrix and optionally at least one zeolite Y with a faujasite structure. The invention also relates to a process for converting hydrocarbon feedstocks that use this catalyst, in particular a hydrocracking process.

BACKGROUND OF THE INVENTION

Hydrocracking of heavy petroleum cuts is a very important refining process which makes it possible, starting from excess heavy feedstocks which are of low value, to produce lighter fractions such as gasolines, jet fuels, and light gas-oils. The refiner seeks to adapt production to demand. Compared to catalytic cracking, the advantage of catalytic hydrocracking is to provide middle distillates, jet fuels, and light gas-oils of very good quality. By contrast, the gasoline that is produced has a much lower octane number than the one that is derived from catalytic cracking.

The catalysts that are used in hydrocracking are all of the bifunctional type that combine an acid function with a hydrogenating function. The acid function is provided by substrates with large surface areas (generally 150 to 800 $m^2.g^{-1}$) that have a surface acidity, such as halogenated aluminas (chlorinated or fluorinated in particular), combinations of boron oxides and aluminum oxides, amorphous silica-aluminas, and zeolites. The hydrogenating function is provided either by one or more metals of group VIII of the periodic table, such as iron, cobalt, nickel, ruthenium, rhodium, palladium, osmium, iridium, and platinum, or by a combination of at least one metal from group VI of the periodic table, such as chromium, molybdenum and tungsten, and at least one metal of group VIII.

The balance between the two acid and hydrogenating functions is the main parameter that controls the activity and selectivity of the catalyst. A weak acid function and a strong hydrogenating function provide low-activity catalysts that work at a generally high temperature (greater than or equal to 390° C.) and at a volumetric flow rate at low feed rate (VVH expressed by volume of feedstock to be treated per unit of volume of catalyst and per hour is generally lower than or equal to 2), but which have very good selectivity for middle distillates. Conversely, a strong acid function and a weak hydrogenating function provide very active catalysts but have poor selectivity for middle distillates. It is therefore possible, by judiciously choosing each of the functions, to adjust the activity/selectivity pair of the catalyst.

Thus, one of the great advantages of hydrocracking is to have great flexibility at various levels: flexibility at the level of the catalysts that are used, which ensures flexibility of the feedstocks that are to be treated, and at the level of the products that are obtained. An easy parameter to control is the acidity of the substrate of the catalyst.

The vast majority of the conventional catalysts for catalytic hydrocracking consist of weakly acidic substrates, such as amorphous silica-aluminas, for example. These systems are used to produce middle distillates of very good quality and, when their acidity is very low, oil bases.

The family of amorphous silica-aluminas is among the not very acid substrates. Many catalysts on the hydrocracking market consist of combined silica-alumina, either a metal of group VIII or, preferably when the contents of heteroatomic poisons of the feedstock to be treated exceed 0.5% by weight, of a combination of sulfides of the metals of groups VIB and VIII. These systems have very good selectivity for middle distillates, and the products that are formed are of good quality. The less-acid representatives of these catalysts can also produce lubricating bases. The drawback of all these catalytic systems with an amorphous substrate base is, as mentioned, their low activity.

SUMMARY OF THE INVENTION

The research work done by the applicant has led him to show that, surprisingly, a catalyst that contains at least one dioctahedral phyllosilicate 2:1, preferably synthesized in a fluoride medium (in the presence of HF acid and/or another source of fluoride anions), then pillared (preferably by the method described here), and optionally combined with a zeolite Y of faujasite structure, makes it possible to achieve a selectivity in middle distillates that is considerably superior to that of the catalysts that are known in the prior art.

This invention relates more specifically to a dioctahedral phyllosilicate 2:1, whose basal spacing, represented by $d_{001}$, is at least equal to $2.0 \times 10^{-9}$ m and that comprises in the interlayer space pillars based on (or comprising or eventually consisting of) at least one of the compounds that is selected from the group that is formed by $SiO_2$, $Al_2O_3$, $TiO_2$, $ZrO_2$, $V_2O_5$, or any combination of the latter.

Preferably, said phyllosilicate contains fluorine.

According to this invention, the pillared dioctahedral phyllosilicates 2:1 (preferably previously prepared in a fluoride medium in the presence of HF acid and/or another source of fluoride anions) have a basal spacing $d_{001}$ that is at least equal to $2.0 \times 10^{-9}$ m, preferably at least equal to $2.65 \times 10^{-9}$ m, and even more preferably greater than $2.8 \times 10^{-9}$ m or else $3.0 \times 10^{-9}$ m; distances at least equal to $3.3 \times 10^{-9}$ m can be achieved particularly in the case of pillars $SiO_2$—$ZrO_2$. Said distance is generally less than or equal to $6.0 \times 10^{-9}$ m, preferably $5.0 \times 10^{-9}$ m. The basal spacing, represented by $d_{001}$, represents the sum of the thickness of a layer and interlayer spacing. This value is directly accessible by the standard method of X-ray diffraction on oriented powder.

The invention also relates to a process for the preparation of said phyllosilicates in which the phyllosilicate is suspended in a solution of a surfactant; then, after the solid is separated from the solution, the phyllosilicate is brought into contact with a mixture that comprises at least one primary or secondary amine and at least one alkoxide of an element that is selected from the group that is formed by Si, Al, Zr, Tl, V.

Dioctahedral phyllosilicates 2:1 are minerals that result from the superposition of elementary layers. Although the chemical bonds between the elements of the structure of the phyllosilicates are ionocovalent, they will be considered ionic in order to simplify the description.

Starting with a representation where $O^{2-}$ ions are in contact with one another in a plane, it is possible to obtain a plane that has a hexagonal cavity, so-called hexagonal plane, by removing one $O^{2-}$ ion of two in a row of two of $O^{2-}$ ions.

The structure of a phyllite can be simply represented starting from arrangements of hexagonal planes of $O^{2-}$ ions and compact planes of $O^{2-}$ and OH— ions. The OH ions fill the cavities of the hexagonal planes of $O^{2-}$ ions. The superposition of two compact planes that are situated between two hexagonal planes makes it possible to define an octahedral layer (O) between two tetrahedral layers (T), hence the name TOT layers.

Such an arrangement, also referred to as 2:1, makes it possible to define a plane of octahedral cavities that is located in the octahedral sheet between two planes of tetrahedral cavities, one in each tetrahedral sheet. Each tetrahedron has an $O^{2-}$ ion that is common with the octahedral sheet, and each of the three other $O^{2-}$ ions is shared with another tetrahedron of the same tetrahedral sheet.

The crystalline unit cell thus consists of 6 octahedral cavities that have 4 tetrahedral cavities on both sides. In the case of a phyllite that consists of elements Si, Al, O, H, such an arrangement corresponds to the ideal formula $Si_4(Al_4\square_2)O_{20}(OH)_4$. The tetrahedral cavities contain the element silicon, octahedral cavities, and the element aluminum, but in this case, one octahedral cavity out of 3 is empty ($\square$). Such a unit is electrically neutral. Often, a half unit cell is used, which has as its formula:

$$Si_4(Al_2\square)O_{10}(OH)_2$$

The tetrahedral silicon element can be substituted by trivalent elements, such as, for example, aluminum or gallium or iron ($Te^{54}$). Likewise, the octahedral aluminum element can be substituted by:

the trivalent elements that are cited above, or a mixture of these elements, divalent elements (Mg).

These substitutions impart negative charges to the structure. Said negative charges account for the existence of exchangeable compensation cations that are located in the interlayer space. The thickness of the interlayer space depends on the nature of the compensation cations and their state of hydration. Furthermore, this space is able to collect other chemical radicals, such as water, amines, salts, alcohols, bases, etc.

The existence of —OH groups produces thermal instability due to the dehydroxylation reaction of the equation: 2 —OH— —O— +$H_2O$. In this connection, the introduction, during synthesis, of the fluorine element into the structure in place of groups O—H leads to phyllosilicates of considerably improved thermal stability.

The phyllosilicates according to the invention are dioctahedral phyllosilicates 2:1, whose characteristics are presented below, in which the pillars have been introduced into the interlayer space (whereby the pillars are selected from among $SiO_2$, $Al_2O_3$, $TiO_2$, $ZrO_2$, $V_2O_5$) to reach a basal spacing $d_{001}$ of at least $2.0\times10^{-9}$ m.

The general chemical formula (for half a unit cell-mesh) of the starting dioctahedral phyllosilicates 2:1, preferably synthesized in a fluoride medium in the presence of HF acid and/or another source of fluoride anions, before pillaring, is the following:

$$M^{m+}{}_{x/m}((Si_{(1-z)}T_z)(T_{2\ 1})O_{10}(OH)_{(2-y)}F_y)^{x-}$$

where

T represents an element that is selected from the complex that is formed by the elements of group IIIA (such as, for example, B, Al, Ga) and iron.

M is at least one compensation cation that is selected from the group that is formed by the cations of the elements of groups IA, IIA, and VIII, whereby the organic cations contain nitrogen, the ammonium cation, and cations of rare earths. The cation comes from the reaction medium into which introduction is done by at least one exchange process. Advantageously, the cation that comes from the reaction medium is selected from the group that is formed by the alkalines (except lithium), the ammonium cation ($NH_4^+$), the organic cations that contain nitrogen (among which figure alkylammonium and arylammonium), and the organic cations that contain phosphorus (among which are alkylphosphonium and arylphosphonium). M can also be a compensation cation that is introduced by post-synthesis ion exchange, selected from the group that is composed of the cations of the elements of groups Ia, IIA, and VIII of the periodic table, the cations of rare earths (cations of elements with atomic numbers of from 57 to 71 inclusive), organic cations that contain nitrogen (among which are alkylammonium and arylammonium), and the ammonium cation.

m is the valence of cation M, x is a number between 0 and 2, preferably 0.1 and 0.8;

y is a number between 0 and 2; if the phyllosilicate contains fluorine, Y is greater than 0;

and $\square$ represents an octahedral cavity.

The x-ray diffraction diagram of the starting dioctahedral phyllosilicate 2:1 (before pillaring) is characterized by the presence of the following lines:

a line that characterizes the $d_{001}$ that is equal to $1.49\pm0.01\times10^{-10}$ m in the case where the dioctahedral phyllosilicate 2:1 comprises an octahedral sheet whose composition is as follows $Si(Al_2\square)$.

at least one reflection 001 such that $d_{001}$ is equal to $1.25\pm0.3\times10^{-9}$ m, depending on the nature of the compensation cation and its hydration state at the moisture level in question.

Preferably, the fluorine content is such that molar ratio F/Si is between 0.1 and 4, and preferably 0.1 and 2.

Dioctahedral phyllosilicate 2:1 that is fluorinated in synthesis also has at least one signal with rotation at the magic angle of $^{19}F$, determined and well known to one skilled in the art. The chemical displacement of this signal also depends on the composition of the octahedral sheet. Thus, it corresponds to a value of:

133 ppm ($\pm5$ ppm) in NMR with rotation at the magic angle of $^{19}F$, in the case where the first neighbors of F are two aluminum atoms; this corresponds to an octahedral sheet whose composition is $Si(Al_2O)$, 108 ppm ($\pm5$ ppm) in NMR with rotation at the magic angle of $^{19}F$, in the case where the first neighbors of F are two gallium atoms; this corresponds to an octahedral sheet whose composition is $Si(Ga_2\square)$, 118 ppm ($\pm5$ ppm) in NMR with rotation at the magic angle of $^{19}F$, in the case where the first neighbors of F are an aluminum atom and a gallium atom; this corresponds to an octahedral sheet whose composition is the following $Si(Ga,Al\square)$.

Said phyllosilicates can advantageously be synthesized in a fluoride medium in the presence of HF acid and/or another source of fluoride anions and at a pH of less than 9, and preferably between 0.5 and 6.5.

The preparation of these kinds of solids in fluoride medium and their characterization are described in the references below, whose teaching is included in this description: Patent FR-A-2673930, a publication at the 202nd meeting of the American Chemical Society (ACS) in New York in August 1991, whose contents were published in Synthesis of Microporous Materials, Extended Clays and Other Microporous Solids (1992), a report from the Académie des Sciences [Academy of Sciences] Paris, t. 315, Series II, pp. 545–549, 1992.

These dioctahedral phyllosilicates 2:1 are pillared by, for example, a new process that comprises the following stages:

the dioctahedral phyllosilicate 2:1, preferably in its $NH_4$ form, is suspended in a solution of a surfactant whose concentration varies between 0.01 mol/liter and 1 mol/liter, and preferably between 0.05 and 0.7 mol/liter. The surfactants that can be used in this stage are of the anionic type, such as, by way of nonlimiting examples, alkylsulfates and alkylsulfonates or else of the cationic type which include, e.g., the halides or hydroxides of tetraalkylammonium such as ketyltrimethylammonium chloride or geminate alkylammonium.

By way of example, hexadecyltrimethylammonium bromide, ethylhexadecyldimethylammonium bromide, octadecyltrimethyl ammonium bromide, dodecyltrimethylammonium bromide, and didodecyldimethylammonium bromide can be used. It is possible to use neutral surfactants, such as, for example, triton X-100 or polyethylene oxides (POE).

After a period of contact, during which the medium is stirred, of between 5 minutes and 12 hours and preferably between 15 minutes and 6 hours, and even more preferably between 15 minutes and 3 hours, the entire complex is filtered and then washed with distilled water, and then finally dried under air or inert gas at a temperature of between 40 and 150° C.; for a period of between 5 minutes and 24 hours and preferably between 30 minutes and 12 hours.

In the case where the phyllosilicate is not in ammonium form, it can first undergo any treatment that is known to one skilled in the art to obtain the dioctahedral phyllosilicate 2:1, which is for the most part in its ammonium form. It is possible to cite, by way of a nonlimiting example of a treatment to bring about this transformation, ion exchange by aqueous solutions of an ammonium salt (ammonium nitrate and/or ammonium chloride).

dioctahedral phyllosilicate 2:1 that is treated according to the operating procedure that is described in the preceding stage is then brought into contact with a mixture that comprises:
  i) at least one primary amine of $RNH_2$ type or a secondary amine R'RNH, where R and R' are advantageously selected from among the entire complex that is formed by the carbon-containing, alkyl, iso-alkyl, naphthenyl, and aromatic groups that may or may not be substituted by other groups and can contain 1 to 16 carbon atoms,
  ii) at least one alkoxide of one element or a mixture of alkoxides, whereby the element is selected from the entire complex that is formed by silicon, aluminum, zirconia, titanium, and vanadium, of general formula M(OR)n, where M is the element that is described above, n is the valence degree of said element, and R is a group that is advantageously selected from the entire complex that is formed by the alkyl, iso-alkyl, naphthenyl, and aromatic groups, which may or may not be substituted. The various —OR groups can be identical or different, depending on the nature of group R that is selected from the entire complex that is defined above.

The entire complex is allowed to remain in contact, preferably while being stirred, during a period of between 5 minutes and 12 hours and preferably between 5 minutes and 8 hours,
  iii) the dioctahedral phyllosilicate 2:1 that is thus pillared is next filtered and then dried under air or under inert gas at a temperature of between 40 and 150° C.; for a period of between 5 minutes and 24 hours and preferably between 30 minutes and 12 hours.

This pillaring process makes it possible to introduce simply and quickly pillars $SiO_2$, $Al_2O_3$, $TiO_2$, $ZrO_2$, $V_2O_5$ or a mixture of these pillars into the interlayer space of the dioctahedral phyllosilicates 2:1, which are advantageously prepared in a fluoride medium.

Compared to the basic dioctahedral phyllosilicate 2:1, the phyllosilicate according to the invention has an x-ray diffraction spectrum that makes it possible to evaluate the basal spacing $d_{001}$, which is thus clearly increased to a value of at least $2.0 \times 10^{-10}$ m. It is also observed that the specific surface area has increased; it is then generally between 200 and 1000 $m^2/g$ and preferably between 250 and 700 $m^2/g$. X-ray spectrum lines $d_{060}$ and NMR lines in rotation at the magic angle of $^{19}F$ are preserved.

This invention also relates to a catalyst that comprises at least one dioctahedral phyllosilicate 2:1 (as described above), whose basal spacing is at least equal to $2.0 \times 10^{-9}$ m and which comprises pillars based on at least one of the compounds that are selected from the group that is formed by $SiO_2$, $Al_2O_3$, $TiO_2$, $ZrO_2$ and $V_2O_5$ or any combination of the latter, at least one matrix, and optionally one zeolite Y.

The catalyst of this invention can also contain a zeolite Y with a faujasite structure (Zéolite Molecular Sieves Structure, Chemistry and Uses, D. W. BRECK, J. WILLEY and Sons 1973), in particular a dealuminated zeolite Y with a crystalline parameter of 24.24 to $24.55 \times 10^{-10}$ m. Among zeolites Y that can be used, a stabilized zeolite Y, commonly called ultrastable or DSY, will preferably be used either in at least partially exchanged form with metal cations, for example, alkaline-earth metal cations and/or cations of rare earth metals with an atomic number of 57 to 71 inclusive, or in hydrogen form.

An acidic zeolite H-Y is particularly advantageous and is characterized by various specifications: an $SiO_2/Al_2O_3$ molar ratio of between 8 and 70 and preferably between about 12 and 40; a sodium content that is less than 0.15% by weight that is determined in the zeolite that is calcined at 1 100° C.; a crystalline parameter of the elementary unit cell that is between $24.55 \times 10^{-10}$ m and $24.24 \times 10^{-10}$ m and preferably between $24.38 \times 10^{-10}$ m and $24.26 \times 10^{-10}$ m; a sodium ion uptake capacity CNa, expressed in grams of Na per 100 grams of modified zeolite, neutralized and then calcined, of greater than about 0.85; a specific surface area, determined by the B.E.T. method, of greater than about 400 $m^2/g$, and preferably greater than 550 $m^2/g$; an adsorption capacity for water vapor at 25° C. at a partial pressure of 2.6 Torr (or 34.6 MPa) of greater than about 6%, a pore distribution, determined by nitrogen physisorption, that encompasses between 5 and 45% and preferably between 5 and 40% of the total pore volume of the zeolite that is contained in the pores with a diameter of between $20 \times 10^{-10}$ m and $80 \times 10^{-10}$ m, and between 5 and 45% and preferably between 5 and 40% of the total pore volume of the zeolite that is contained in the pores with a diameter of greater than 80 to $10^{-10}$ m and generally less than $1000 \times 10^{-10}$, whereby the rest of the pore volume is contained in the pores with a diameter of less than $20 \times 10^{-10}$ m.

The catalyst of this invention also contains at least one matrix that is usually amorphous or poorly crystallized and is selected from, for example, the group that is formed by alumina, silica, magnesia, titanium oxide, zirconia, aluminum phosphates, titanium phosphates or zirconium phosphates, boron oxide, combinations of at least two of these compounds, and boron alumina-oxide combinations.

The matrix is preferably selected from the group that is formed by silica, alumina, magnesia, silica-alumina combinations, and silica-magnesia combinations.

The catalyst of this invention therefore contains:

a) From 1 to 80%, or else 4 to 70%, preferably 10 to 60% and even more preferably 15 to 50% by weight of at least one dioctahedral phyllosilicate 2:1 that is preferably synthesized in a fluoride medium and pillared, b) 0 (or 0.1) to 30%, preferably 0 (or 0.1%) to 20% and even more preferably 0 (or 0.1) to 10% of at least one zeolite Y with a faujasite structure, hydrogen form, preferably having the characteristics that are set forth above, c) 1 to 99% by weight of at least one matrix that is defined above.

The catalyst of this invention can be prepared by any methods that are well known to one skilled in the art. One of the preferred methods in this invention consists in mixing the pillared dioctahedral phyllosilicate 2:1 and optionally a zeolite Y in a wet alumina gel for several tens of minutes and then passing the paste that is thus obtained through a die to form extrudates with a diameter of between 0.4 and 4 mm.

Generally, the catalyst also contains at least one catalytic element, for example a metal that has a hydro-dehydrogenating function. The hydro-dehydrogenating function is generally provided by at least one metal or metal compound of group VIII, such as nickel and cobalt in particular. It is possible to use a combination of at least one metal or metal compound of group VI (in particular molybdenum or tungsten) and at least one metal or metal compound of group VIII (in particular cobalt or nickel) of the periodic table. The total concentration of metal oxides of groups VI and/or VIII is between 1 and 40% by weight and preferably between 3 and 40%, advantageously between 8 and 40%, even 10 to 40% and even better 10–30% by weight, and the ratio by weight, expressed in metal oxide of metal (or metals) of group VI to metal (or metals) of group VIII, is between 1.25 and 20 and preferably between 2 and 10. Moreover, this catalyst can contain phosphorus. The phosphorus content, expressed in phosphorus oxide concentration $P_2O_5$, will be less than 15% by weight and preferably less than 10% by weight.

The hydrogenating function as defined above (metals of group VIII or a combination of metal oxides of groups VI and VIII) can be introduced into the catalyst with various levels of preparation and in various ways.

Said hydrogenating function can be introduced either in part only (case of combinations of metal oxides of groups VI and VIII) or in its entirety at the time when dioctahedral phyllosilicate 2:1, synthesized in the fluoride medium and pillared, is mixed with the oxide gel that is selected as matrix. Said hydrogenating function can be introduced by one or more ion exchange operations on the calcined substrate that consists of the dioctahedral phyllosilicate 2:1 that is synthesized in a fluoride medium and optionally pillared and distributed in the selected matrix, with the aid of solutions that contain the precursor salts of the metals that are selected when the latter belong to group VIII. Said hydrogenating function can be introduced by one or more impregnation operations of the substrate that is shaped and calcined, by a solution of the precursors of the metal oxides of groups VIII (in particular cobalt and nickel) when the precursors of the metal oxides of groups VI (in particular molybdenum or tungsten) have been previously introduced at the time of mixing of the substrate. Finally, said hydrogenating function can be introduced by one or more impregnation operations of the calcined substrate that consist of a dioctahedral phyllosilicate 2:1 that is synthesized in a fluoride medium and pillared and of the matrix, by solutions that contain the precursors of the metal oxides of groups VI and/or VIII, whereby the precursors of the metal oxides of group VIII are preferably introduced after those of group VI or at the same time as the latter.

In the case where the metal oxides are introduced in several impregnations of the corresponding precursor salts, an intermediate calcination stage of the catalyst should be carried out at a temperature of between 250 and 600° C.

The impregnation of molybdenum can be facilitated by adding phosphoric acid to the solutions of ammonium paramolybdate.

The catalysts that are thus obtained are used in general for the conversion of hydrocarbons, and in particular for hydrocracking. In hydrocracking, compared to the prior art, they have greater selectivity for the production of middle distillates of very good quality.

The feedstocks that are used in the process are gas-oils, gas-oils under vacuum, deasphalted or hydrotreated residues or equivalents. These can be heavy fractions that consist of at least 80% by volume of compounds whose boiling points are between 350 and 580° C. (i.e., corresponding to compounds that contain at least 15 to 20 carbon atoms). They generally contain heteroatoms such as sulfur and nitrogen. The nitrogen content is usually between 1 and 5000 ppm by weight, and the sulfur content is between 0.01 and 5% by weight. The hydrocracking conditions, such as temperature, pressure, hydrogen recycling rates, and hourly volume velocity, can be highly variable depending on the nature of the feedstock, the quality of desired products, and the installations that the refiner uses.

The temperatures are generally greater than 230° C. and are often between 300° C. and 480° C., preferably less than 450° C. Pressure is greater than or equal to 2 MPa and in general greater than 3 MPa, even 10 MPa. The hydrogen recycling rate is at least 100 and often between 260 and 3000 liters of hydrogen per liter of feedstock. The hourly volume velocity is in general between 0.2 and 10 $h^{-1}$.

The results that are important to the refiner are activity and selectivity for middle distillates. The targets that are set should be achieved under conditions that are compatible with economic reality. Thus, the refiner seeks to reduce the temperature, the pressure, and the hydrogen recycling rate and to maximize the hourly volume velocity. It is known that conversion can be increased by raising temperature, but this is often at the expense of selectivity. Selectivity for middle distillates is improved if the pressure or hydrogen recycling rate is increased, but this is at the expense of the economy of the process. This type of catalyst makes it possible to achieve, under standard operating conditions, selectivities for middle distillates with a boiling point of between 150° C. and 380° C. that are greater than 65%, for conversion levels, in products with a boiling point of less than 380° C. (380° C.), or more than 55% by volume. This catalyst also exhibits, under these conditions, remarkable stability. Finally, because of the composition of the catalyst, the latter can be easily regenerated.

In general, it has been observed that dioctahedral phyllosilicates 2:1 according to the invention have remarkable thermal stability since they are able to withstand temperatures of 800° C. without degradation.

The following examples illustrate this invention without, however, limiting its scope.

EXAMPLE 1

Preparation of a Pillared Dioctahedral Phyllosilicate 2:1 (PDP1), which is of the Beidellite Type in a Na Form, According to the Invention.

For this preparation, the following are added to 36 g of distilled water successively and according to the indications provided:

0.31 g of NaF salt (Prolabo) while being stirred moderately, 0.66 g of HF acid at 40% (Fluka), 2.35 g of hydrated AlOOH oxyhydroxide (Catapal B Vista) while being stirred vigorously, 2.50 g of powdered $SiO_2$ oxide (Aerosil 130 from Degussa), while being stirred moderately.

The composition of the hydrogel that is thus prepared, referred to one mol of $SiO_2$ oxide, is 1.0 $SiO_2$; 0.382 $Al_2O_3$; 0.177 NaF; 0.20 HF; 48 $H_2O$ or, in terms of molar ratio:

| | | |
|---|---|---|
| Si/Al | = | 1.309 |
| Na'/Si | = | 0.177 |
| F/Si | = | 0.377 |
| HF/Si | = | 0.20 |
| $H_2O$/Si | = | 48. |

This composition does not take into account the water that is supplied by the aluminum source and by the HF acid.

The hydrogel that is thus obtained is cured for 4 hours at ambient temperature (20° C.) while being stirred moderately. The pH is then close to 5.

Crystallization is then carried out in a steel autoclave, sheathed with a coating of polytetrafluoroethylene (Teflon), with a capacity of 120 ml, at 220° C., under autogenous pressure for 168 hours without stirring. The autoclave is then cooled with ambient air. The pH at the end of synthesis is about 4.

The product is then recovered, filtered, and washed thoroughly with distilled water. It is then dried at 40–50° C. for 24 hours. At the end of these 24 hours, the product that is obtained, at 50% relative humidity, is characterized by is x-ray diffraction diagram that is indicated below:

| $d_{hkl}$ (A) | I/Io |
|---|---|
| 12.42 | 100 |
| 6.22 | 6 |
| 4.46 | 55 |
| 2.55 | 21 |
| 2.48 | 15 |
| 2.25 | 2 |
| 2.22 | 3.5 |
| 1.74 | 6 |

-continued

| $d_{hkl}$ (A) | I/Io |
|---|---|
| 1.73 | 6 |
| 1.69 | 13 |
| 1.66 | 7 |
| 1.62 | 2 |
| 1.48 | 20 |

The swelling properties of the phyllosilicate that is obtained are recorded in the table below:

| | HR 50% | HR 80% | 14% glycerol in ethanol |
|---|---|---|---|
| $d_{hkl}$ (A) | 12.4 | 15.5 | 17.6 |

HR: Relative humidity.

The content by weight of the phyllosilicate fluorine that is obtained is 3.15%. A signal at −133 ppm, which is obtained with rotation at the magic angle of $^{19}F$ of the phyllosilicate that is prepared according to this example, is present in the NMR spectrum.

The solid that is thus prepared is then subjected to three successive ion-exchange treatments with an ammonium nitrate solution to obtain the $NH_4^4$ form of the phyllosilicate. For this purpose, 10 grams of phyllosilicate that is prepared in advance is suspended in 250 ml of a molar solution of ammonium nitrate and then stirred under reflux for 2 hours. The solid is then filtered and washed. This treatment cycle is repeated twice more. The solid that is obtained in then dried at 60° C. for 10 hours.

The dioctahedral phyllosilicate 2:1 that is thus prepared is referred to as PD1. The latter will then undergo a pillaring stage according to the operating procedure that is described below.

8 g of the dioctahedral phyllosilicate 2:1 that is thus prepared and is referred to as PD1 and in the form of $NH_4$ is suspended in 80 ml of a hexadecyltrimethylammonium chloride (CTMA-Cl) solution with a concentration of 0.1 M. After an hour of stirring at ambient temperature, the entire complex is filtered, washed with 200 ml of distilled water twice, and then dried at 60° C. for 8 hours. The PD1 sample, which was previously treated with CTMA, is suspended with a mixture that consists of 4.48 g of octylamine ($C_8H_{17}NH_2$) and 60.32 g of ethyl tetraorthosilicate (Si $(OEt)_4$. After 30 minutes of stirring, the entire complex is filtered and then dried at 60° C. for 8 hours. The sample is then calcined at 530° C. for 3 hours under air and then for 2 hours under pure oxygen.

The $d_{001}$ of the sample after calcination is 34.6 Å, and its specific surface area is 390 $m^2/g$.

The dioctahedral phyllosilicate 2:1 that is thus prepared is referred to as PDP1.

EXAMPLE 2

Preparation of Catalyst C1 (According to the Invention)

Dioctahedral phyllosilicate 2:1 PP1 as described in Example 1 is mixed with the alumina of type SB3 that is supplied by the Condéa Company. The mixed paste is then extruded through a die with a diameter of 1.4 mm. The extrudates are impregnated dry with a solution of a mixture of ammonium heptamolybdate, nickel nitrate, and orthophosphoric acid, and finally calcined under air at 55020 C. in situ in the reactor. The contents by weight of active oxides are as follows (relative to the catalyst):

2.5% by weight of phosphorus oxide $P_2O_6$

15% by weight of molybdenum oxide $MoO_3$

5% by weight of nickel oxide NiO

The pillared clay content in the entire catalyst is 30%.

EXAMPLE 3

Preparation of a Pillared Diooctahedral Phyllosilicate 2:1 PDP2, which is a Beidellite in Ammonium Form, According to the Invention.

For this preparation, the following are added to 36 g of distilled water successively and according to the indications provided:

0.385 g of $NH_4F$ salt (Prolabo) while being stirred moderately, 0.312 g of HF acid at 40% (Fluka), 2.71 g of hydrated AlOOH oxyhydroxide (Catapal B Vista) while being stirred vigorously, 2.50 g of powdered $SiO_2$ oxide (Aerosil 130 from Degussa), while being stirred moderately.

The composition of the hydrogel that is thus prepared, referred to one mol of $SiO_2$ oxide, is 1.0 $SiO_2$; 0.44 $Al_2O_3$; 0.25 $NH_4F$; 0.15 HF; 48 $H_2O$ or in terms of molar ratio:

| | | |
|---|---|---|
| Si/Al | = | 1.136 |
| $NH_4$/Si | = | 0.25 |
| F/Si | = | 0.40 |
| HF/Si | = | 0.15 |
| $H_2O$/Si | = | 48. |

This composition does not take into account the water that is supplied by the aluminum source and by the HF acid.

The hydrogel that is thus obtained is cured for 4 hours at ambient temperature (20° C.) while being stirred moderately. The pH is then close to 5.

Crystallization is then carried out in a steel autoclave, sheathed by a Teflon coating, with a capacity of 120 ml, at 220° C., under autogenous pressure for 168 hours without stirring. The autoclave is then cooled with ambient air. The pH at the end of synthesis is about 5.5.

The product is then recovered, filtered, and washed thoroughly with distilled water. It is then dried at 40–50° C. for 24 hours. At the end of these 24 hours, the product that is obtained, at 50% relative humidity, is characterized by its x-ray diffraction diagram, which is similar to the one that is provided in the table of Example 1.

The content by weight of the phyllosilicate fluorine that is obtained is 2.9%. A signal at −133 ppm, which is obtained with rotation at the magic angle, of $^{19}F$ of the phyllosilicate that is prepared according to this example is present in the NMR spectrum.

The dioctahedral phyllosilicate 2:1 that is thus prepared is referred to as PD2. The latter will then undergo a pillaring stage according to the operating procedure that is described below.

8 g of the dioctahedral phyllosilicate 2:1 that is thus prepared and referred to as PD2 and is ammonium form is suspended in 80 ml of a hexadecyltrimethylammonium chloride solution (CTMA-Cl) with a concentration of 0.1 M. After one hour of stirring at ambient temperature, the entire complex is filtered, washed with 2×200 ml of distilled water, and then dried at 60° C. for 8 hours. The PD2 sample that is treated with CTMA above is suspended in a mixture that consists of 4.48 g of octylamine ($C_8H_{17}NH_2$) and 60.32 g of ethyl tetraorthosilicate (Si(OEt)$_4$) and 2.96 g of aluminum isoproxide. After 30 minutes of stirring, the entire complex is filtered and then dried at 60° C. for 8 hours. The sample is then calcined at 530° C. for 3 hours under air and then for 2 hours under pure oxygen.

The $d_{001}$ of the sample after calcination is 31.2 Å and a specific surface area of 375 m$^2$/g.

The dioctahedral phyllosilicate 2:1 that is thus prepared is referred to as PDP2.

EXAMPLE 4

Preparation of Catalyst C2 (According to the Invention)

Catalyst C2 is prepared according to the same operating procedure as the one that is described in Example 2, but this time using dioctahedral phyllosilicate 2:1 PDP2.

The pillared clay content by weight in the entire catalyst is 30%.

EXAMPLE 5

Preparation of a Pillared Dioctahedral Phyllosilicate 2:1 PDP3, which is an H-Shaped Beidellite with $SiO_2$—$ZrO_2$ Pillars 10 g of beidellite PD2, prepared according to Example 3 of this patent and calcined at 550° C. for 4 hours, is suspended in 442 ml of an ethylhexadecyldimethylammonium bromide solution (EtC$_{16}$DMABr) of 0.1 M. After 1 hour of stirring at ambient temperature, the entire complex is filtered and then dried at 60° C. for 1 night (about 12 hours).

5 g of the PD2 beidellite that is treated by EtC$_{16}$DMABr is suspended in a mixture that consists of 37.7 g of ethyl tetraorthosilicate (TEOS), 1.4 g of Zr(OC$_3$H$_7$)$_4$, and 2.8 g of octylamine (TEOS/octylamine=8.2 and TEOS/Zr(OC$_3$H$_7$)$_4$=40 molar ratios). The entire complex is stirred for 30 minutes at room temperature, and then filtered and dried at 60° C. for 12 hours. The material is then calcined at 600° C. according to the following program: temperature raised from ambient temperature to 600° C. in 8 hours, calcination under dry air at 600° C. for 4 hours, and then temperature is dropped back to ambient temperature.

The mass loss due to calcination is on the order of 23%. Periodicity $d_{001}$ of product PDP3 is 37.4 Å, and the specific surface area is on the order of 530 m$^2$/g.

EXAMPLE 6

Catalyst C4 according to the invention is then prepared according to the operating procedure that is described in Example 2 using the PDP3 sample. The content by weight of pillared beidellite PDP3 according to the invention, in the entire catalyst C4, is 50%.

EXAMPLE 7

Preparation of a Pillared Dioctahedral Phyllosilicate 2:1 PDP4, which is an H-Shaped Beidellite with by $SiO_2$ Pillars.

5 g of beidellite in the form of treated hydrogen EtC$_{18}$DMABr is suspended in a mixture of 37.7 g of TEOS and 1.26 g of decylamine ($C_{10}H_{21}NH_2$). After 30 minutes of stirring, the entire complex is filtered and dried at 60° C. before being calcined at 600° C. according to the operating procedure that is described above in Example 5.

The mass loss as a result of calcination in this case reaches 22%. Periodicity $d_{001}$ of referenced sample PDP4 is 37 Å, and the specific surface area is about 460 m$^2$/g.

EXAMPLE 8

Catalyst C5 according to the invention is then prepared according to the operating procedure that is described in Example 2 by using sample PDP4. The content by weight of pillared beidellite PDP4 according to the invention, in the entire catalyst C5, is 40%.

EXAMPLE 9
Preparation of Catalyst C3 (Not According to the Invention)

For this example, a zeolite H-Y is used whose physio-chemical characteristics are as follows:

Overall atomic Si/Al (measured by X fluorescence): 17.5
skeleton atomic Si/Al (determined by NMR of $^{29}$Si): 21
Na content (ppm by weight): 450
crystalline parameter (x-ray diffraction) (Å): 24.27

3% by weight of pure nitric acid is added to 67% by dry weight of zeolite powder H-Y to ensure the peptization of the powder. After mixing, the paste that is obtained is extruded through a die with a diameter of 1.4 mm. The extrudates are calcined, then impregnated dry with a solution of a mixture of ammonium heptamolybdate, nickel nitrate and orthophosphoric acid, and finally calcined under air at 550° C. in situ in the reactor. The contents by weight of active oxides are as follows (relative to the catalyst):

2.5% by weight of phosphorus oxide P2O5,
15% by weight of molybdenum oxide MoO3,
5% by weight of nickel oxide NiO.

The content by weight of H-Y zeolite in the entire catalyst is 10%.

EXAMPLE 10
Evaluation of Catalysts C1, C2, C3, C4, and C5 in a Hydrocracking Test Catalysts C1, C2, C3, C4 and C5, the steps for whose preparation are described in the examples above, are used under hydrocracking conditions on a petroleum feedstock whose main characteristics are as follows:

| | |
|---|---|
| starting point | 277° C. |
| 10% point | 381° C. |
| 50% point | 482° C. |
| 90% point | 531° C. |
| end point | 545° C. |
| pour point | +39° C. |
| density (20/4) | 0.919 |
| sulfur (% by weight) | 2.46 |
| nitrogen (% by weight) | 930 |

The catalytic test unit comprises a fixed-bed reactor, with upward circulation of the feedstock ("up-flow"), into which is introduced 80 ml of catalyst. Each of the catalysts is sulfurated with an n-hexane/DMDS+aniline mixture up to 320° C. The total pressure is 9 MPa, the hydrogen flow is 1000 liters of gaseous hydrogen per liter of injected feedstock, and the hourly volume velocity is 1.0.

The catalytic performance levels are expressed by coarse selectivity, which is measured for a coarse conversion of 70% by weight. These catalytic performance levels are measured on the catalyst after a stabilization period, generally at least 48 hours, has elapsed.

Coarse conversion CB is set equal to:

CB=% by weight of 380- in the effluents

Coarse selectivity (% by weight) SB is set equal to:

$$SB = \frac{\text{weight of } 150/380 \text{ effluents}}{\text{weight of } 380 - \text{effluents}} \times 100$$

| Catalysts | C1 according to the invention | C2 according to the invention | C3 not according to the invention | C4 according to the invention | C5 according to invention |
|---|---|---|---|---|---|
| SB (70% CB) | 73.5 | 72.9 | 68.2 | 74.1 | 73.0 |

The use of a pillared dioctahedral phyllosilicate 2:1 according to the invention therefore makes possible a substantial gain in selectivity for middle distillates with iso-conversion.

EXAMPLE 11
Evaluation of Catalysts C1, C2 and C3 in a Low-Pressure Hydrocracking Test Catalysts C1, C2, and C3 have been compared in a low-pressure hydrocracking test, which is also called mild hydrocracking. The feedstock that is used during the catalytic test is the same as the one used in Example 10.

The catalytic test unit comprises a fixed-bed reactor, with upward feedstock circulation ("up-flow"), into which is introduced 80 ml of catalyst. Each of the catalysts is sulfurated with an n-hexane/DMDS+aniline mixture to 320° C. The total pressure is 5 MPa, the hydrogen flow is 500 liters of gaseous hydrogen per liter of injected feedstock, and the hourly volume velocity is 0.5.

The catalytic performance levels are expressed by coarse selectivity for a coarse conversion of 50%. These catalytic performance levels are measured on the catalyst after a stabilization period, generally at least 48 hours, has elapsed.

Coarse conversion CB is set equal to:

CB=% by weight of 380- in the effluents

Coarse selectivity (% by weight) SB is set to equal to:

$$SB = \frac{\text{weight of } 150/380 \text{ effluents}}{\text{weight of } 380 - \text{effluents}} \times 100$$

| Catalyst | C1 according to the invention | C2 according to the invention | C3 not according to the invention |
|---|---|---|---|
| SB (50% CB) | 84.2 | 84.8 | 80.5 |

The preceding examples can be repeated with similar success by substituting the generically or specifically described reactants and/or operating conditions of this invention for those used in the preceding examples.

The entire disclosure of all applications, patents and publications, cited above, and of corresponding French applications No. 97/12.864 and 97/12.865, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A dioctahedral phyllosilicate 2:1 whose basal spacing is at least equal to $2.00 \times 10^{-9}$ m and which comprises fluorine and in the interlayer space pillars based on members consisting essentially of at least one of the compounds from the group consisting of $SiO_2$, $Al_2O_3$, $TiO_2$, $ZrO_2$, and $V_3O_5$.

2. A dioctahedral phyllosilicate 2:1 according to claim 1, whose basal spacing is at least equal to $2.65 \times 10^{-9}$ m.

3. A dioctahedral phyllosilicate 2:1 according to claim 1, whose basal spacing is at least equal to $3.0 \times 10^{-9}$ m.

4. A dioctahedral phyllosilicate 2:1 according to claim 1, whose basal spacing is at least equal to $3.3 \times 10^{-9}$ m.

5. A dioctahedral phyllosilicate 2:1 according to claim 1, whose basal spacing is at most $6.0 \times 10^{-9}$ m.

6. A dioctahedral phyllosilicate 2:1 according to claim 1, prepared in a fluoride medium.

7. A dioctahedral phyllosilicate 2:1 according to claim 6 that has been synthesized in a fluorinated medium in the presence of HF acid and at a pH of less than 9.

8. A dioctahedral phyllosilicate 2:1 according to claim 1, wherein the pillars are based on $SiO_2$.

9. A dioctahedral phyllosilicate 2:1 according to claim 1, wherein the pillars are based on $V_2O_5$.

10. A catalyst that comprises at least one dioctahedral phyllosilicate 2:1 according to claim 1, at least one matrix, and optionally a zeolite Y.

11. A catalyst according to claim 10 that comprises
    1–80% by weight of at least one dioctahedral phyllosilicate 2:1
    0–30% by weight of at least one zeolite Y,
    1–99% by weight of at least one matrix.

12. A catalyst according to claim 10, which also comprises at least one catalytic element.

13. A catalyst according to claim 12, in which the catalytic element is hydrodehydrogenating element.

14. A catalyst according to claim 10 that also comprises phosphorus.

15. A catalyst according to claim 10, wherein the matrix is selected from the group consisting of alumina, silica, magnesia, titanium oxide, zirconia, titanium phosphates, zirconium phosphates, and boron oxides.

16. A catalyst according to claim 10, comprising a dioctahedral phyllosilicate 2:1 that contains fluorine.

17. A catalyst according to claim 10, comprising a dealuminated zeolite Y.

18. A process for preparation of a dioctahedral phyllosilicate 2:1 according to claim 1, in which the phyllosilicate is suspended in a solution of a surfactant and then, after the solid is separated from the solution, the phyllosilicate is brought into contact with a mixture that comprises at least one primary or secondary amine and at least one alkoxide of an element consisting of selected from the group that is Si, Al, Zr, Ti, and V.

19. A process according to claim 18, in which the phyllosilicate that is suspended is in ammonium form ($NH_4^+$).

20. A process according to claim 18, in which the surfactant solution has a concentration of 0.01 mol/liter to 1 mol/liter.

21. A process according to claim 18, in which primary amine $RNH_2$ or secondary amine R'RNH have radicals R and R' that are selected from the group consisting of the alkyl, iso-alkyl, naphthenyl, and aromatic radicals, which may or may not be substituted, R and R' that have 1 to 16 carbon atoms, and a process in which alkoxide M(OR)n of element M has a radical R consisting of selected from the group that is the alkyl, iso-alkyl, naphthenyl, aromatic radicals, which may or may not be substituted and which have 1 to 16 carbon atoms.

22. A catalyst that comprises at least one dioctahedral phyllosilicate 2:1 that is prepared according to claim 18, at least one matrix, and optionally one zeolite Y.

23. In a catalytic process for the conversion of hydrocarbons, the improvement comprising conducting the conversion in contact with a catalyst according to claim 10.

24. A process according to claim 23, wherein the conversion is hydrocracking and the catalyst also comprises at least one hydrodehydrogenating element.

25. A process according to claim 24 conducted at more than 230° C., under a pressure of at least 2 MPa and with a VVH of 0.2–10 $h^{-1}$.

26. A process according to claim 24, wherein the conversion is conducted on gas-oils, vacuum gas-oils, deasphalted residues, or hydrotreated residues.

* * * * *